United States Patent
Nakatsuka et al.

(10) Patent No.: US 7,048,173 B2
(45) Date of Patent: May 23, 2006

(54) WAVE SOLDERING METHOD USING LEAD-FREE SOLDER, APPARATUS THEREFOR, AND WAVE-SOLDERED ASSEMBLY

(75) Inventors: Tetsuya Nakatsuka, Yokohama (JP); Masahide Okamoto, Yokohama (JP); Tomoyuki Ohmura, Yokohama (JP); Asao Nakano, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 470 days.

(21) Appl. No.: 10/133,778

(22) Filed: Apr. 25, 2002

(65) Prior Publication Data

US 2003/0116352 A1 Jun. 26, 2003

(30) Foreign Application Priority Data

Dec. 21, 2001 (JP) ............................. 2001-388814

(51) Int. Cl.
*B23K 1/08* (2006.01)

(52) U.S. Cl. ............................. 228/37; 228/43

(58) Field of Classification Search ................ 228/260, 228/37, 42, 43, 219, 223
See application file for complete search history.

(56) References Cited

U.S. PATENT DOCUMENTS

| | | | | |
|---|---|---|---|---|
| 3,705,457 A | * | 12/1972 | Tardoskegyi | 228/219 |
| 4,321,031 A | * | 3/1982 | Woodgate | 432/11 |
| 4,771,929 A | * | 9/1988 | Bahr et al. | 228/102 |
| 5,125,556 A | * | 6/1992 | Deambrosio | 228/42 |
| 5,158,224 A | * | 10/1992 | Baker et al. | 228/37 |
| 5,228,614 A | * | 7/1993 | Elliott et al. | 228/37 |
| 5,230,460 A | * | 7/1993 | Deamborsio et al. | 228/180.1 |
| 5,941,448 A | * | 8/1999 | Sindzingre et al. | 228/206 |
| 6,021,940 A | * | 2/2000 | Sindzingre et al. | 228/203 |
| 6,074,203 A | * | 6/2000 | Leturmy et al. | 432/47 |
| 6,578,752 B1 | * | 6/2003 | Willemen | 228/56.1 |
| 2003/0116352 A1 | * | 6/2003 | Nakatsuka et al. | 174/263 |

FOREIGN PATENT DOCUMENTS

| | | |
|---|---|---|
| JP | 11-261209 | 9/1999 |
| JP | 2000-188464 | 7/2000 |

* cited by examiner

*Primary Examiner*—Jonathan Johnson
(74) *Attorney, Agent, or Firm*—Townsend and Townsend and Crew LLP

(57) ABSTRACT

The present invention relates to a wave soldering method and a wave soldering apparatus using lead-free solder comprising a wave soldering step in which the lower side of a substrate with leads of component parts inserted in through-holes formed in the substrate from the upper side is wave soldered by contact with a molten lead-free solder blowout at a wave soldering portion provided in a chamber, and a cooling step in which an inert gas in the chamber is recirculated and cooled and is blown to the lower side of the substrate wave soldered with the lead-free solder in the wave soldering step and being conveyed, to cool the lower side of the substrate, at a blowing portion provided adjacently to the wave soldering portion in the chamber, and an apparatus therefor.

18 Claims, 5 Drawing Sheets

WAVE SOLDERING METHOD USING LEAD-FREE SOLDER, APPARATUS THEREFOR, AND WAVE-SOLDERED ASSEMBLY

BACKGROUND OF THE INVENTION

The present invention relates to a method for manufacturing an electronic circuit board using a lead-free solder alloy having little toxicity, an apparatus therefor, and a soldered assembly using the same. The lead-free solder alloy is an alternative to Sn-37Pb (unit: mass %) solder used for soldering at around 220° C. which can be applied to connection of electronic component parts to a circuit substrate such as an organic substrate.

General lead-free solders constituted of Sn, Ag, Cu, Bi, Zn or the like are inferior in wettability to copper electrodes on a circuit substrate, as compared with the conventional Sn—Pb based lead-containing solders, and the lead-free solders are known to be strongly affected by oxidation of electrodes due to oxygen present in the atmospheric air.

It is known that the poor wettability has a great influence on the easiness of flowing-in of solder in the penetrating holes accompanied by copper electrode called through-holes for fixing inserted component parts to a substrate. For example, when the wettability becomes bad, the amount of the solder flowing into the through-hole is reduced, and the solder would not comes up to the upper side of the substrate through the through-hole, resulting in that the flow-up ratio is lowered. The flow-up ratio is defined by the value obtained by dividing the length from the lower side of the substrate to the level to which the solder comes up by the length from the lower side to the upper side of the substrate. When the flow-up ratio is thus lowered, the leads of the inserted component parts are fixed with small amounts of solder, resulting in that the reliability of the connection portions is lowered.

It is said that a flow-up ratio of about 80% is sufficient for contriving high reliability of connection portions. Therefore, in a wave soldering apparatus applicable to lead-free solder, soldering must be performed in an inert atmosphere such as nitrogen with an oxygen concentration of generally not more than 1%, and the soldering portion must be located in an inert gas atmosphere chamber for filling with an inert gas such as nitrogen.

In addition, it is known that when wave soldering (flow soldering) of inserted component parts is conducted by the use of lead-free solder, the so-called lift-off phenomenon of exfoliation of the solder at the connection portion from the copper electrode on the substrate occurs. In order to restrain the lift-off phenomenon, the substrate must be rapidly cooled immediately after soldering, so that a large amount of a refrigerant must be blown to the soldered portion. Besides, since the soldering is conducted in an inert atmosphere such as nitrogen, the refrigerant is limited to the same fluid as the inert atmosphere.

In addition, in the apparatus for conducting wave soldering of inserted component parts by the use of lead-free solder, there has recently been a demand for frequent changes of the wave soldering conditions so as to allow the apparatus to be applicable to many kinds of substrates.

SUMMARY OF THE INVENTION

In order to solve the above-mentioned problems, it is an object of the present invention to provide a method and an apparatus for wave soldering (flow soldering) a substrate (inserted component parts) by the use of lead-free solder by which the lift-off phenomenon is markedly suppressed and high reliability of connection portions can be secured.

It is another object of the present invention to provide an apparatus and a method for wave soldering a substrate (inserted component parts) using lead-free solder by which the lift-off phenomenon is markedly suppressed, high reliability of connection portions can be secured, and production time of one wave-soldered substrate is as short as possible so that the wave soldering conditions can be frequently changed to be applicable to many kinds of substrates.

It is a further object of the present invention to provide an apparatus and a method for wave soldering of a substrate (inserted component parts) using lead-free solder by which the lift-off phenomenon is markedly suppressed, high reliability of connection portions can be secured, and the chamber for forming an inert gas atmosphere such as nitrogen is of a small type.

In accordance with one aspect of the present invention, there is provided a wave soldering method using lead-free solder, for wave soldering (flow soldering) a substrate with component parts mounted thereon from the upper side (for example, with leads of component parts inserted into through-holes formed in the substrate from the upper side) by using lead-free solder in a chamber filled with an inert gas atmosphere, the method comprising the steps of: conveying in the substrate through an inlet of the chamber; preheating the lower side of the substrate conveyed in in the conveying-in step at a preheating portion provided in the chamber; wave soldering the lower side of the substrate preheated in the preheating step and conveyed, by contact with a molten lead-free solder blowout at a wave soldering portion provided in the chamber; cooling the lower side of the substrate flow soldered with the lead-free solder in the wave soldering step and conveyed, by recirculating and cooling the inert gas atmosphere in the chamber and blowing the recirculated and cooled inert gas atmosphere to the lower side of the substrate at a blowing portion provided in proximity to or adjacently to the wave soldering portion in the chamber; and conveying out the substrate having the lower side cooled in the cooling step through an outlet of the chamber.

In accordance with another aspect of the present invention, there is provided a wave soldering apparatus using lead-free solder, for wave soldering (flow soldering) a substrate with component parts mounted thereon from the upper side (for example, with leads of component parts inserted into through-holes formed in the substrate from the upper side) by using lead-free solder in a chamber filled with an inert gas atmosphere, wherein a conveying means for conveying the substrate from an inlet to an outlet of the chamber is provided, and a preheating portion for preheating the lower side of the substrate conveyed in through the inlet of the chamber by the conveying means, a wave soldering portion for wave soldering the lower side of the substrate preheated at the preheating portion and conveyed by the conveying means by contact with a molten lead-free solder blowout, and a cooling portion comprising a blowing portion for blowing through recirculating and cooling the inert gas atmosphere in the chamber to the lower side of the substrate flow-soldered with the lead-free solder at the wave soldering portion and conveyed by the conveying means are provided in the chamber.

The step of applying flux to the lower side of the substrate may be provided before the cooling step.

An intake port for sucking in the inert gas may be provided adjacently to the blowing portion, and the inert gas atmosphere in the chamber may be recirculated and cooled from the intake port to the blowing portion and blown, in the cooling step.

The blowing of the cooled inert gas from the blowing portion to the lower side of the substrate may be conducted intermittently.

The recirculation and cooling of the inert gas atmosphere may be conducted by a blower and a cooler, in the cooling step.

A mechanism or device which can convey the substrate and which restrains flowing-in of air into the chamber at least at the time of cooling may be provided at the inlet and the outlet of the chamber.

An inert gas curtain for restraining flowing-in of air into the chamber may be provided at the inlet and the outlet of the chamber.

The substrate may be conveyed by mounting on a conveying holder, and the conveying holder may be so constructed as to restrain flowing-in of air into the chamber when the conveying holder is located at the inlet and the outlet of the chamber.

The substrate may be conveyed by the conveying means through mounting it on a conveying holder, and a station where the conveying holder can stand by may be provided at the inlet and the outlet of the chamber.

The substrate may be conveyed by a conveyor as the conveying means through mounting it on a conveying holder, and the conveying holder may have such a structure as to follow up to changes in shape attendant on the movement of the conveyor.

In order to reduce slipping of the conveying holder due to insufficient contact between the conveying holder and the conveying means by a sag or the like of the conveying means (conveyor) for conveying the conveying holder and to prevent bad conveying, the contact portion with the conveying means of the conveying holder may have such a structure as to follow up to the shape such as sag of the conveying means (changes in shape attendant on the movement of the conveying means).

In accordance with a further aspect of the present invention, there is provided a wave-soldered assembly (a mounted assembly) which has been wave soldered by use of the wave soldering method using lead-free solder as mentioned above.

Thus, according to the present invention, the flow of the inert gas atmosphere generated in the chamber at the time of cooling the lower side of the substrate and the flows of air in the vicinity of the inlet and the outlet of the chamber can be made as small as possible in scale, the lower side of the substrate can be cooled efficiently, the lift-off phenomenon can be markedly suppressed, and high reliability of connection portions can be secured.

BRIEF DESCRIPTION OF THE DRAWINGS

The above and other objects, features and advantages of the present invention will become more apparent from the following description taken in connection with the accompanying drawings, in which.

Figure 1:
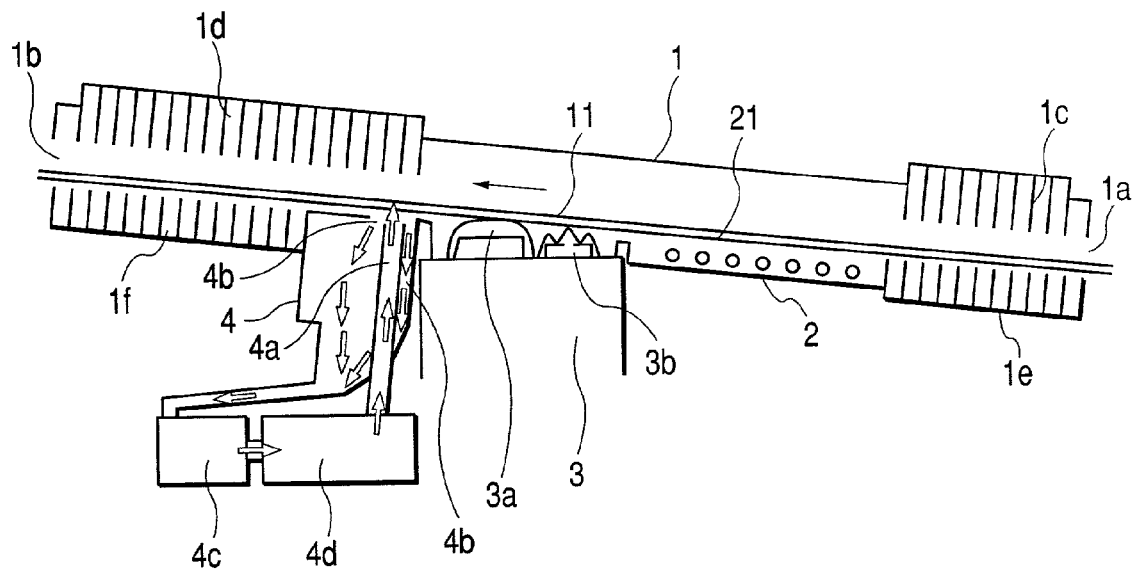
FIG. 1 is a side view of an inert gas atmosphere chamber comprising a substrate lower side cooling portion having a structure in which one blowing portion (for example, a blow nozzle) is disposed between two intake ports, which is a second embodiment of a wave soldering apparatus using lead-free solder according to the present invention.

In the drawings, reference character 1 denotes an inert gas atmosphere chamber, 1a denotes an inlet of the chamber, 1b denotes an outlet of the chamber, 1c, 1d, 1e, and 1f denote diffusion-preventing fins, 1g denote a valve or shutter, 1h denote an inert gas curtain, 2 denotes a substrate preheating portion, 3 denotes a wave soldering portion, 3a denotes a molten solder, 4 denotes a substrate lower side cooling portion, 4a denotes a blowing nozzle (blowing portion), 4b denotes an intake port, 4c denotes a blower, 4d denotes a chiller, 4e denotes a shutter, 11 denotes a substrate, 21 denotes a substrate conveyer (conveying means), 22 denotes a station, 101 denotes a substrate conveying holder, 101a denotes a conveyer contact portion, 101b denotes a valve, and 101c denotes a movable contact portion of the conveyer.

DESCRIPTION OF THE PREFERRED EMBODIMENTS

Now, some embodiments of the method and apparatus for wave soldering (flow soldering) using lead-free solder according to the present invention will be described referring to the drawings.

As shown in FIGS. 1 to 5 and 8, the present invention intends to reduce as much as possible in scale the flow of an inert atmosphere generated in an inert gas atmosphere chamber 1 at the time of cooling the lower side of a substrate 11 and the flows of atmospheric air in the vicinity of an inlet 1a and an outlet 1b for the substrate 11 provided in the chamber 1, which are the main causes of sucking-in of atmospheric air into the chamber 1.

Accordingly, a wave soldering apparatus using lead-free solder according to the present invention comprises a substrate conveyor 21 for conveying the substrate 11 with leads of inserted component parts (not shown) inserted therein from the upper side of the substrate 11, and the chamber 1 filled with an inert gas atmosphere such as nitrogen so provided as to surround the upper side and the lower side of the substrate 11 conveyed by the substrate conveyor 21. In the vicinity of each of the inlet 1a and the outlet 1b of the chamber 1, comb tooth shaped diffusion-preventing fins 1c, 1d are provided on the upper side, and comb tooth shaped diffusion-preventing fins 1e, 1f are provided on the lower side. Since the leads of inserted component parts are inserted into the substrate on the upper side of the substrate 11, the clearance between the lower ends of the diffusion-preventing fins 1c, 1d on the upper side and the substrate conveyor 21 is made to be wide so that the substrate 11 can pass therethrough. On the other hand, the clearance between the upper ends of the diffusion-preventing fins 1e, 1f on the lower side and the substrate conveyor 21 is made to be narrow. The substrate 11 with flux applied thereto in a flux-applying step is conveyed into the chamber 1 filled with the inert gas atmosphere through the inlet 1a by the substrate conveyor 21.

A heater (substrate preheating portion) 2 preheats the lower side of the substrate 11 coated with the flux and conveyed in, and is provided on the lower side of the substrate 11 in the chamber 1.

A wave soldering portion 3 performs wave soldering of the lower side of the substrate 11 preheated by the heater 2 by the use of a lead-free solder blowout (a lead-free solder gush), and is comprised of a primary-side nozzle portion 3a for roughening a soldering portion by blowing out molten solder, and a molten solder portion 3b for forming the molten solder. That is, the wave soldering portion 3 performs wave soldering of the lower side of the substrate 11 by bringing the molten lead-free solder blowout into contact with the lower side of the substrate 11.

A substrate lower side cooling portion 4 cools the lower side of the substrate 11 wave soldered at the wave soldering portion 3 by blowing the inert gas in the chamber 1 to the lower side of the substrate 11, is comprised of one blow nozzle 4a disposed between two intake ports 4b as shown in FIGS. 1 to 4, and is attached to the chamber 1 adjacently to the wave soldering portion 3. Thus, the shapes of the opening portions of the blow nozzle 4a and the intake ports 4b of the substrate lower side cooling portion 4 are both rectangular.

With this configuration, the inert gas such as nitrogen ejected from the blow nozzle 4a is recovered by a blower 4c through the intake ports 4b on both sides of and adjacent to the blow nozzle 4a immediately after cooling the lower side of the substrate 11, is cooled by a chiller (cooler) 4d or the like, and is then reused for the cooling of the lower side of the substrate 11.

In the cooling of the lower side of the substrate 11, in order to restrain lift-off, a flow rate of about several cubic meters per minute is needed in the case where the refrigerant is nitrogen at room temperature, and if such a flow rate is maintained constantly, stabilization of the inert atmosphere in the chamber is hampered. Therefore, it is desirable that the cooling of the lower side of the substrate 11 is conducted intermittently, namely, for a predetermined period of time from the instant immediately after the substrate 11 is soldered at the wave soldering portion 3.

In addition, the intermittent use of the lower side cooling mechanism 4 for the substrate 4 results in a need for turning the switch of the blower 4 ON and OFF. However, the lower side cooling mechanism 4 is also used during the period after the switch is turned ON until the flow rate is stabilized and during the period after the switch is turned OFF until the flow rate is reduced to zero, which is poor in cooling efficiency.

Figure 2:
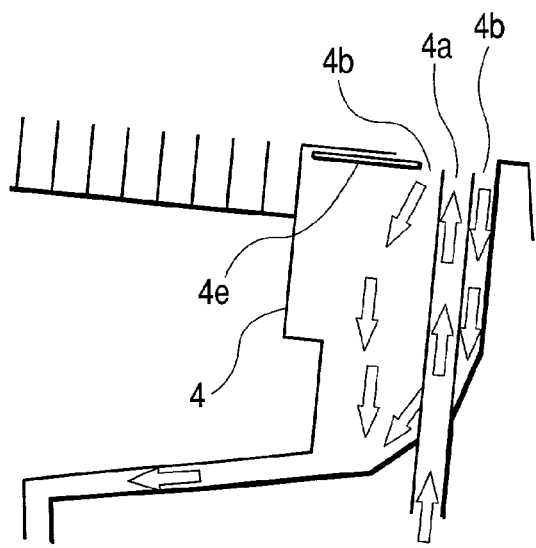
FIG. 2 is a side view of a substrate lower side cooling portion provided with a shutter according to the present invention.

Therefore, it is desirable that the blow nozzle 4a is provided with a shutter 4e as shown in FIG. 2, the switch of the blower 4 is preliminarily turned ON several seconds before the substrate 11 comes to the lower side cooling portion 4 for the substrate 11, the shutter 4e is opened simultaneously when the leading edge of the substrate 11 comes to the cooling portion 4, the shutter 4e is closed simultaneously when the trailing edge of the substrate 11 passes by the cooling portion 4, and then the switch of the blower 4c is turned OFF.

Next, at the time of cooling the lower side of the substrate 11, an open-close valve or open-close shutter 1g for restraining sucking-in of atmospheric air is closed at the inlet 1a of the chamber 1 through which the substrate 11 is conveyed in and at the outlet 1b of the chamber 1 through which the substrate 11 is conveyed out, and the inside of the chamber 1 is hermetically sealed from the exterior, whereby the flows of atmospheric air in the vicinity of the inlet 1a and the outlet 1b of the chamber 1 can be made to be as little as possible, the length in the substrate conveying direction of the diffusion-preventing fins 1c to 1f can be made short, and the chamber 1 for establishing the inert gas atmosphere can be made small in scale.

Figure 5:
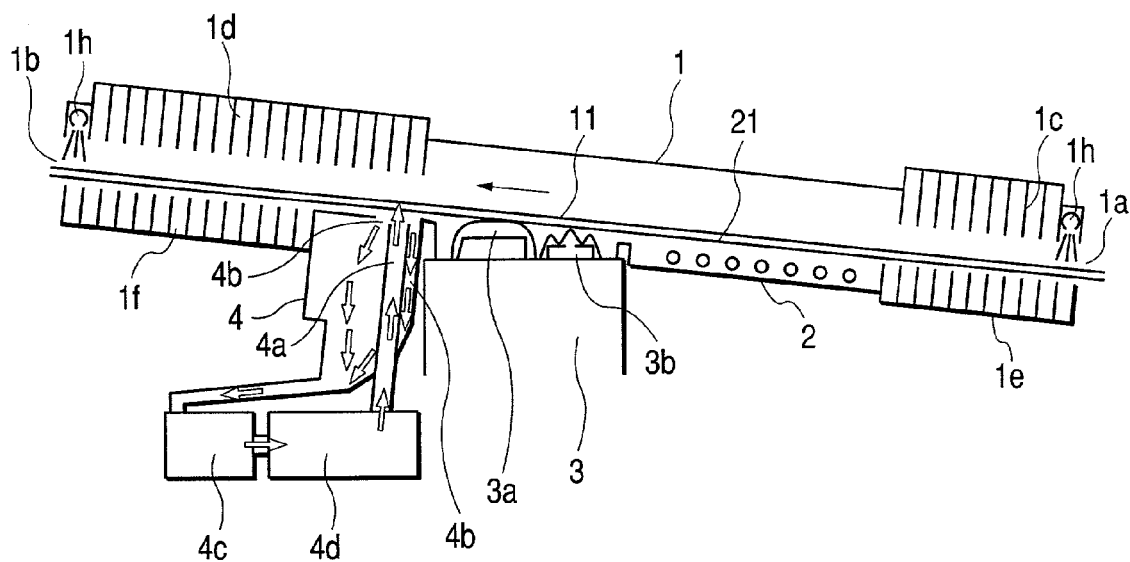
FIG. 5 is a side view showing a state in which an inert gas curtain for restraining sucking-in of atmospheric air is fitted to an inlet and an outlet of an inert gas atmosphere chamber, which is the third embodiment of the wave soldering apparatus using lead-free solder according to the present invention.

In the case of FIG. 5, an inert gas generating nozzle 1h is provided at the inlet 1a and the outlet 1b of the chamber 1, and a curtain of inert gas such as nitrogen is formed so as to shield the inside of the chamber 1 from the exterior.

Figure 6:
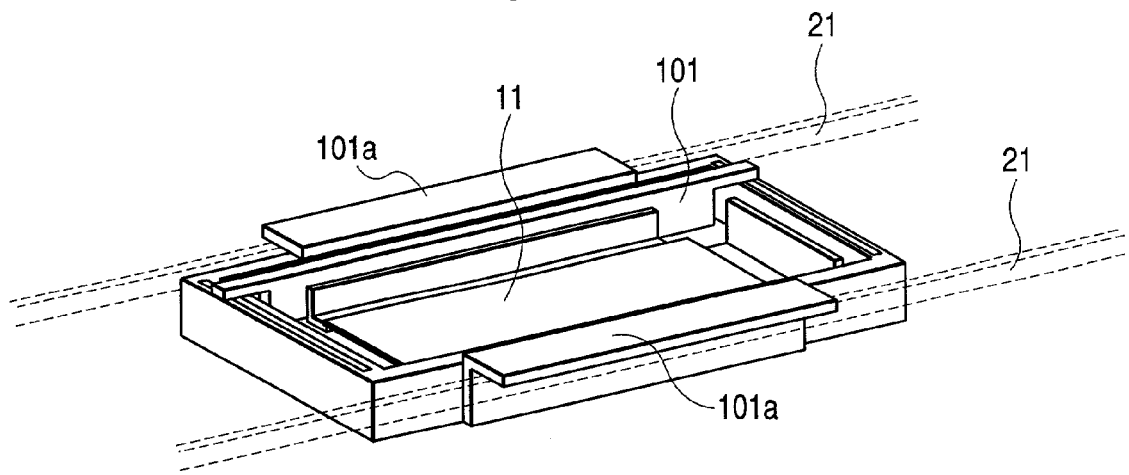
FIG. 6 is a schematically perspective view of a substrate-conveying holder.
Figure 7:
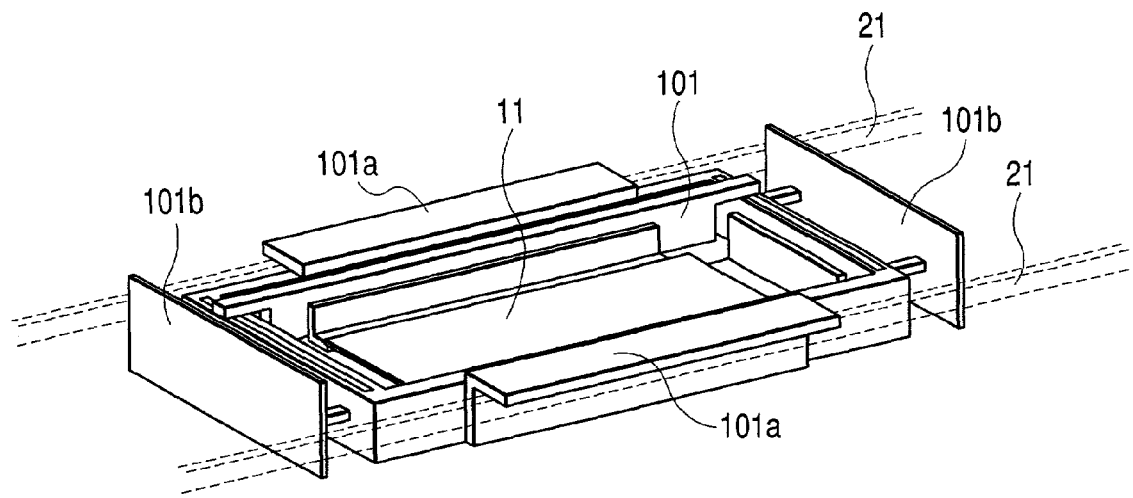
FIG. 7 is a schematically perspective view of a substrate-conveying holder provided with a valve for restraining sucking-in of atmospheric air.

In the case of conveying the substrate 11 by the use of a substrate holder 101 as shown in FIG. 6, a valve 101b or the like for restraining sucking-in of atmospheric air is provided on the substrate conveying holder side as shown in FIG. 7, and when the substrate 11 in the substrate conveying holder 101 is subjected to soldering, two holders 101 of other holders 101 are made to stand by at stations 22 provided respectively at the inlet 1a and the outlet 1b of the chamber 1 or one holder 101 is made to stand by at a station 22 provided at the inlet 1a or the outlet 1b of the chamber 1, whereby the inside of the chamber 1 filled with the inert gas atmosphere can be shielded from the exterior.

Figure 8:
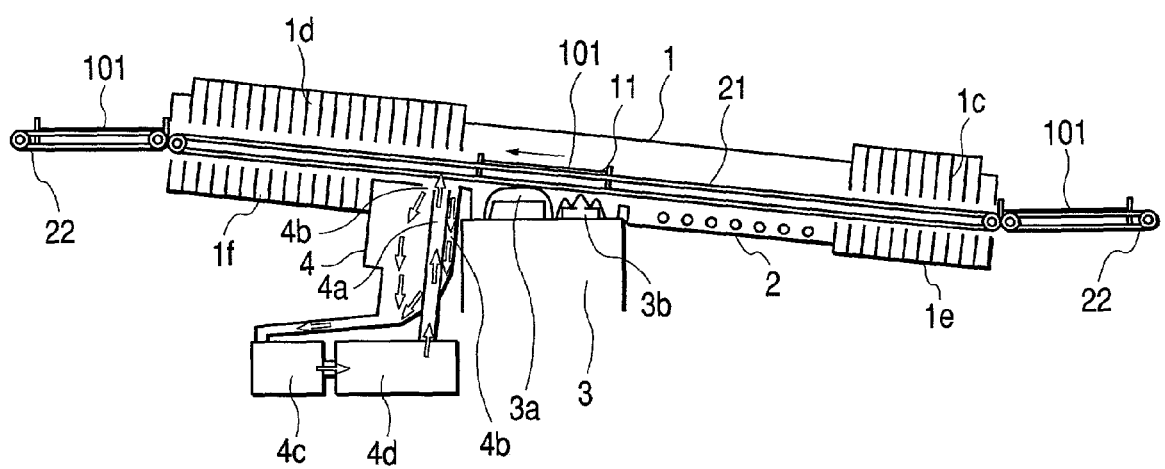
FIG. 8 is a side view showing a state in which the substrate conveying holder provided with the valve for restraining sucking-in of atmospheric air is standing by at stations at the inlet and the outlet of the inert gas atmosphere chamber, which is the third embodiment of the wave soldering apparatus using lead-free solder according to the present invention.

FIG. 8 shows a state in which two substrate conveying holders 101 are standing by at the stations 22 provided respectively at the inlet 1a and the outlet 1b of the chamber 1 when the substrate 11 in the substrate conveying holder 101 is soldered at the soldering portion 3.

However, in the case where the substrate conveying holder 101 repeats going and stopping on the conveyor in the soldering apparatus by the above-mentioned method, there may be a possibility that the substrate conveying holder 101 slips because it cannot follow up to changes in the movement of the conveyor. This is due to generation of sag or the like in the conveyor 21 and the resultant insufficient contact between the substrate conveying holder 101 and the conveyor 21.

The slippage would easily occur in the case where an upward gradient is intentionally provided in the conveyor 21 at the soldering portion 3 for the purpose of preventing a shortcircuit generated at a minute soldering portion which is called bridge. In order to prevent the slippage, it is necessary that the contact portion for the conveyor 21 of the substrate conveying holder 101 have such a structure as to follow up to the shape of a sag or the like of the conveyor 21.

In addition, in the case where the substrate conveying holder 101 is conveyed by the use of two chain-type conveyors, a difference between sag amounts of the conveyors may be generated and the degree of parallel of the conveyors is impaired, which would also cause insufficient contact between the substrate conveying holder 101 and the chain-type conveyors.

Figure 9:
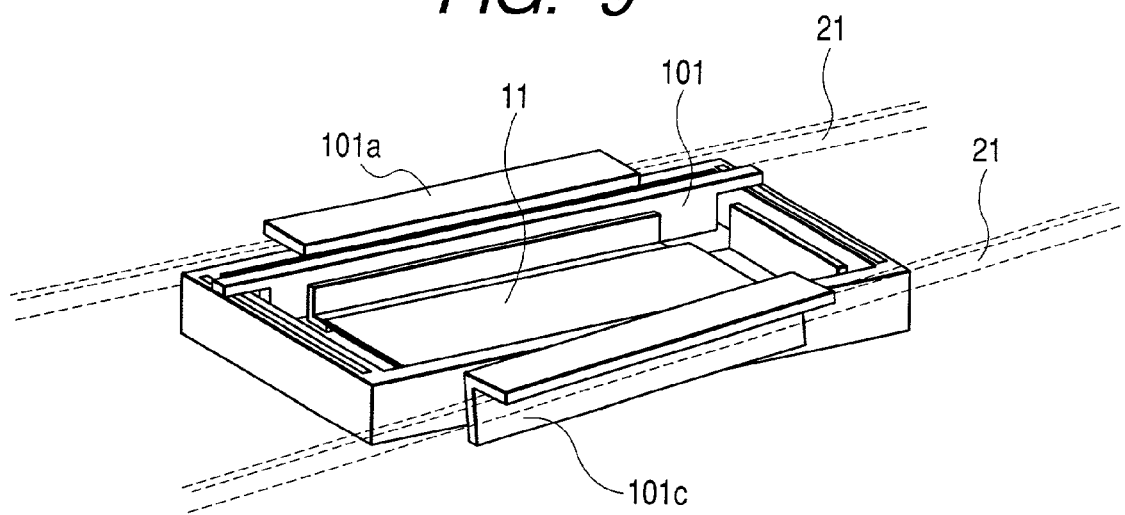
FIG. 9 is a general view of a substrate conveying holder in which a conveyor contact portion on one side is movable so that sufficient contact between the substrate conveying holder and the conveyor can be secured even when the degree of parallel of two conveyors is impaired.

In view of this, one of the conveyor contact portions 101a of the substrate conveying holder 101 is constituted of a movable-type contact portion 101c as shown in FIG. 9, whereby sufficient contact between the substrate conveying holder 101 and the conveyors 21 can be secured even when the degree of parallel of the two conveyors is impaired.

Figure 3:
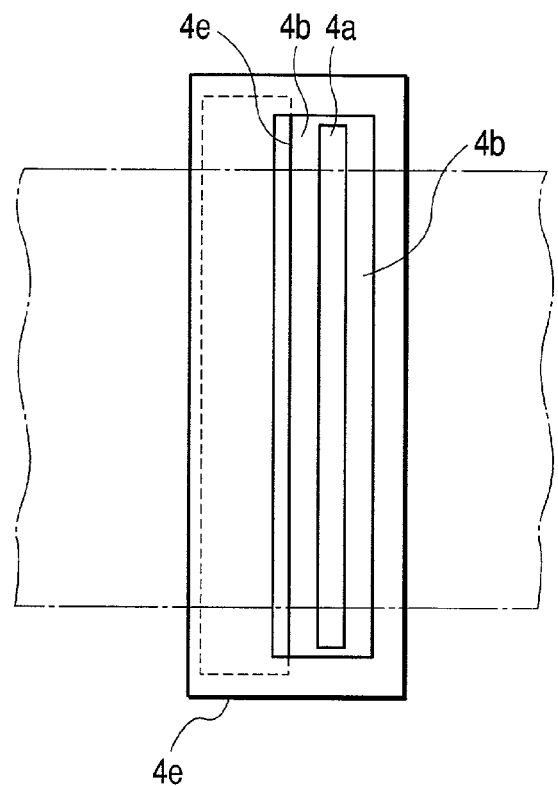
FIG. 3 is a plan view of FIG. 2.
Figure 4:
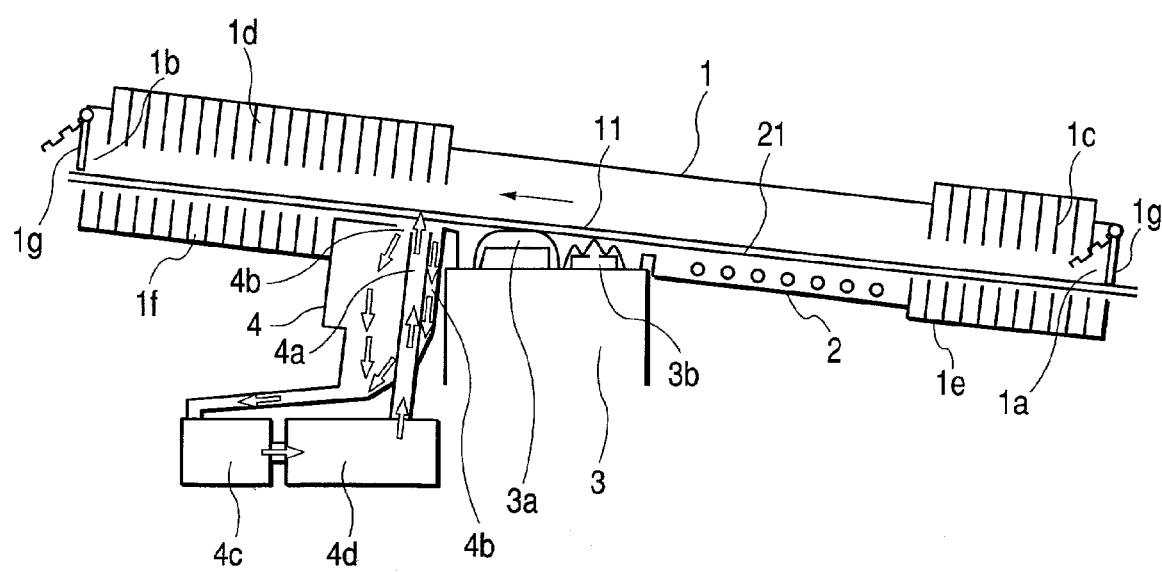
FIG. 4 is a side view showing a state in which a valve or shutter for restraining sucking-in of atmospheric air is attached to an inlet and an outlet of an inert gas atmosphere chamber, which is a third embodiment of the wave soldering apparatus using lead-free solder according to the present invention.
Figure 10:
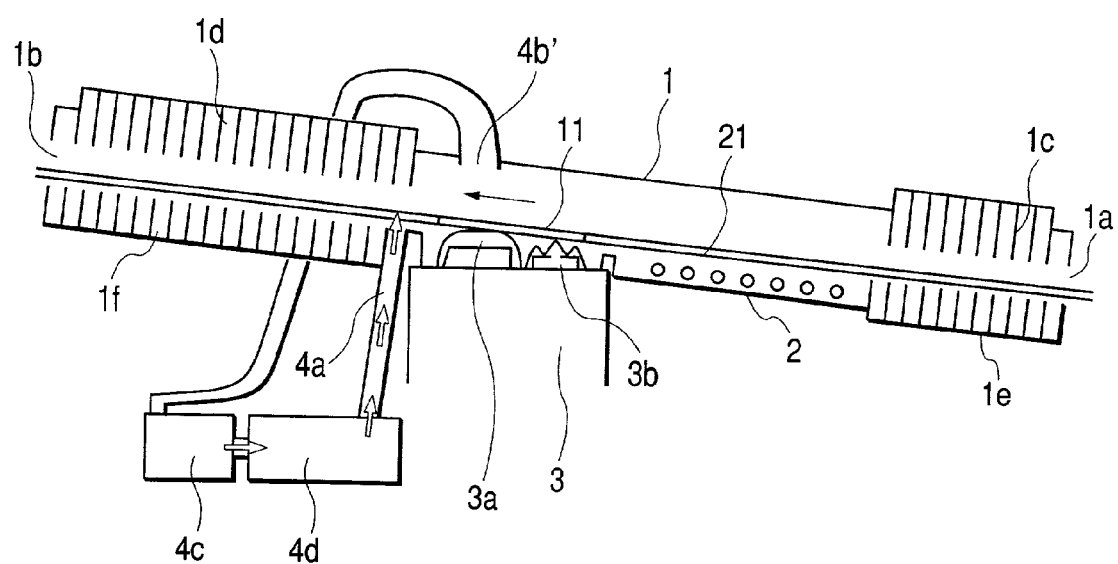
FIG. 10 is a side view of an inert gas atmosphere chamber comprising a substrate lower side cooling portion, which is a first embodiment of the wave soldering apparatus using lead-free solder according to the present invention.

The constitution shown in FIG. 10 differs from the constitution shown in FIG. 1 in that the intake port 4b' is provided on the upper side of the substrate 11 directly above the wave soldering portion 3, and the intake port 4b' is connected to the blower 4c. The blow nozzle 4a is provided in proximity to the wave soldering portion 3, in the same manner as in FIG. 1. As a result, the inert gas such as nitrogen in the chamber 1 is recovered by the blower 4c through the intake port 4b' directly above the wave soldering portion 3, is cooled by the chiller (cooler) 4d or the like, and is then used for cooling the lower side of the substrate 11. In this constitution also, the intake port 4b' and the blow nozzle 4a may be provided with shutters 4e, as shown in FIGS. 2 and 3. Besides, as shown in FIGS. 4 and 5, the open-close valve or open-close shutter 1g and/or an inert gas shower 1h may be provided at the inlet 1a and the outlet 1b of the chamber 1.

[First Embodiment]

A substrate 11a was used which had a thickness of about 1.6 mm, the number of layers of 12, and a through-hole inside diameter of about 0.8 mm.

The substrate 11a had a QFP (Quad Flat Package)-LSI and the like connected thereto in the previous steps. Next, terminals of a plastic-made connector, a 400-pin PGA (Pin Grid Array package)-LSI and the like to be wave soldered were inserted and fitted into through-holes from the upper side of the substrate 11a.

Thus, the substrate 11 to be wave soldered was prepared, and flux was to be applied to wave soldering portions of the substrate 11 in a flux-applying step precedent to a step carried out by the wave soldering apparatus.

The wave soldering apparatus used according to the present invention is of the type of direct conveying the substrate 11 without using a holder intermediately. The substrate 11 is passed sequentially through a flux-applying portion (not shown) and then a substrate preheating portion 2, a wave soldering portion 3, and a substrate lower side cooling portion 4 provided in the chamber 1 so as to constitute the wave soldering apparatus, as shown in FIG. 10. The chamber 1 has a construction for surrounding the substrate-preheating portion 2, the wave soldering portion 3 and the substrate lower side cooling portion 4.

The conditions for wave soldering are as follows:

The flux-applying system is a spray system, and an application amount per unit area of the substrate is 150 cc/m$^2$.

Preheating of the substrate was conducted at the substrate preheating portion 2 by the use a sheathed heater at about 300° C. for about 30 sec. The composition of the solder used at the wave soldering portion 3 is lead-free Sn-3Ag-0.5Cu (unit: mass %), and the solder temperature is about 250° C.

The cooling air used at the substrate lower side cooling portion 4 was provided by utilizing a nitrogen atmosphere in the chamber. As shown in FIG. 10, to provide the cooling air, the nitrogen atmosphere in the chamber sucked in through an intake port 4b' provided in the chamber on the upper side of the substrate 11 directly above the wave soldering portion 3 was blown by a blower 4c, was cooled to room temperature by a chiller 4d, and the cooled nitrogen atmosphere was blown from a cooling air blow nozzle 4a provided adjacently to the wave soldering portion 3 to the substrate 11. The cooling was conducted while the substrate 11 was present at the cooling portion 4, and the flow rate was about 2 m$^3$/min.

The velocity of the substrate conveyor 21 was 1.2 m/min for all steps.

As a result, it was found that the lift-off generation rate at the connection portions of the 400-pin PGA-LSI thus wave soldered was about 0.1%, and the lift-off generation rate for the plastic-made connector was about 0.5%.

The oxygen concentration in the chamber at the time of wave soldering was about 8000 ppm with respect to a target of 10000 ppm (1%); thus, the target was scarcely satisfied. As a result, the percentage of the connection portions where a target flow-up ratio of 80% as an index of wettability cannot be attained was about 10%. The flow-up ratio is an index of wettability of the wave solder with the length of the through-hole (roughly corresponding to the plate thickness of the substrate) set as 100%. The target flow-up ratio of 80% means that 80% of the length of the through-hole is wetted with the wave solder. The wettability has relation to the oxygen concentration in the chamber.

[Second Embodiment]

A second embodiment differs from the first embodiment in that a substrate lower side cooling portion 4 as shown in FIGS. 2 and 3 was used.

Preheating was conducted by the use of a sheathed heater at 300° C. for about 30 sec, in the same manner as in the first embodiment. In the same manner as in the first embodiment, the composition of the solder used for wave soldering (flow soldering) is lead-free Sn-3Ag-0.5Cu (unit: mass %), and the solder temperature is 250° C.

As shown in FIGS. 2 and 3, the cooling air used at the substrate lower side cooling portion 4 was provided by utilizing the nitrogen atmosphere in the chamber. To provide the cooling air, the atmosphere sucked in through two intake ports 4b connected to the chamber 1 was blown by a blower 4c, was cooled to room temperature by a chiller 4d, and the cooled atmosphere was blown from a cooling air blow nozzle 4a connected to the chamber 1 to the lower side of the substrate 11. The cooling air blow nozzle 4a is disposed between the two intake ports 4b. In the same manner as in the first embodiment, the cooling was conducted while the substrate 11 was present at the cooling portion 4, and the flow rate was 2 m$^3$/min.

The velocity of the substrate conveyor 21 was set in the same manner as in the first embodiment.

As a result, it was found that the lift-off generation rate of connection portions of a 400-pin PGA-LSI thus wave soldered was about 0.1%, and the lift-off generation rate of a plastic-made connector was about 0.5%.

With the two intake ports 4b provided on both sides of the cooling air blow nozzle 4a, the oxygen concentration in the chamber at the time of soldering was about 5000 ppm with respect to a target value of 10000 ppm (1%), and thus the target was sufficiently attained. As a result, the percentage of connection portions where a target flow-up ratio of 80% as an index of wettability cannot be attained was halved to about 5%, as compared with the first embodiment.

[Third Embodiment]

A third embodiment differs from the second embodiment in that a nitrogen curtain 1h or a shutter 1g was attached to both the inlet 1a and the outlet 1b of the chamber 1.

Preheating was conducted by using a sheathed heater at 300° C. for about 30 sec, in the same manner as in the first and second embodiments. In the same manner as in the first and second embodiments, the composition of the solder used for wave soldering is lead-free Sn-3Ag-0.5Cu (unit: mass %), and the solder temperature is 250° C.

Cooling of the lower side of the substrate 11 was conducted in the same manner as in the second embodiment. The velocity of the substrate conveyor 21 was also set in the same manner as in the first and second embodiments.

As a result, it was found that the lift-off generation rate of connection portions of a 400-pin PGA-LSI thus wave soldered was 0.1%, and the lift-off generation rate of a plastic-made connector was about 0.5%.

The oxygen concentration in the chamber at the time of soldering was about 1000 ppm, one order lower than a target value of 10000 ppm when the nitrogen curtain 1h disposed at the inlet 1a and the outlet 1b of the chamber 1 was always used while the shutter 1g was always opened. When the nitrogen curtain disposed at the inlet 1a and the outlet 1b of the chamber 1 was always not used and the shutter 1g was opened only when the substrate 11 or the substrate conveying holder 101 with the substrate 11 mounted thereon was passing through the inlet 1a and the outlet 1b of the chamber 1, the oxygen concentration in the chamber 1 at the time of soldering was as low as about 500 ppm, about 5% with respect to the target value of 10000 ppm. As a result, the percentage of connection portions where a target flow-up ratio of 80% as an index of wettability cannot be attained was further lowered, as compared with the second embodiment, to about 3%.

[Fourth Embodiment]

A fourth embodiment differs from the second embodiment in that a system of conveying the substrate 11 by a substrate conveying holder 101 was adopted, and penetration of atmospheric air into the chamber 1 was restrained by the substrate conveying holders 101 standing by at the inlet 1a and the outlet 1b of the chamber 1, as shown in FIG. 8.

The wave soldering apparatus was of the system of conveying the substrate 11 by the substrate conveying holder 101. The substrate 11 is attached onto the substrate conveying holder 101 at a substrate attachment portion (not shown), the substrate 11 is then conveyed together with the substrate conveying holder 101 through a flux-applying portion (not shown) to reach the inlet 1a of the chamber 1, is then passed sequentially through a substrate preheating portion 2, a wave soldering portion 3 and a substrate lower side cooling portion 4 in the chamber 1, is conveyed out through the outlet 1b of the chamber 1, and is again returned to the substrate attachment portion.

The three steps of substrate preheating, wave soldering and substrate lower side cooling were conducted on a single independently controllable conveyor 21, as shown in FIG. 8, and the conveyor 21 is surrounded by the single chamber 1. At both ends of the conveyor 21, namely, at the chamber inlet 1a and the outlet 1b, stations 22 where the substrate-conveying holder 101 can dwell are provided respectively.

With this arrangement, first, before the holder (called holder A) 101 conveying the substrate 11 to be wave soldered enters the chamber 1, holders 101 are present at the two stations 22 at the chamber inlet 1a and the outlet 1b, whereby the penetration of atmospheric air into the chamber 1 is restrained.

Next, when the holder A approaches the chamber inlet 1a, the holder 101 having been standing by at the chamber outlet 1b starts moving toward the substrate-fitting portion (not shown), whereas the holder 101 having been standing by at the station 22 at the chamber inlet 1a starts to move toward the chamber outlet 1b, and stands by there. From behind the holder A, another holder starts to follow the holder A.

When the holder A has entered the chamber 1 and wave soldering is conducted, the following holder stands by at the station at the chamber inlet 1a. If the substrate 11 is mounted on the following holder 101, thereafter, wave soldering for the holder 101 is conducted in the chamber in the same manner as in the case of the holder A.

Therefore, when the holder 101 is present in the chamber 1, soldering can be conducted while maintaining a low oxygen concentration.

Substrate preheating is conducted by use of a sheathed heater at 300° C., in the same manner as in the first to third embodiments; in concrete, the preheating is conducted by stopping the substrate 11 over the sheathed heater for an arbitrary period of time of 30 sec at minimum and 50 sec at maximum. The stoppage period is determined according to the heat content of the substrate 11, and is longer for the substrate with a greater heat content.

The composition of the solder used for wave soldering and the solder temperature are the same as in the first to third embodiments.

Cooling of the lower side of the substrate is also conducted in the same manner as in the second and third embodiment.

The velocity of the substrate conveyor from the wave soldering portion 3 to the substrate lower side cooling portion 4 was set arbitrary in the range from 1.2 m/min at minimum to 1.6 m/min at maximum. The conveying velocity (feed speed) is determined according to the thermal resistance of the substrate 11, and when parts liable to be broken by thermal influence from the wave soldering are present on the substrate, the substrate feed speed must be enhanced to reduce the total heat quantity that the substrate receives from the molten solder.

Three kinds of substrate soldering conditions are given in Table 1 below.

TABLE 1

|  | Thickness of substrate (mm) | Number of layers | Preheating time (sec) | Feed speed of substrate at soldering portion (m/min) |
| --- | --- | --- | --- | --- |
| Substrate 1 | 1.2 | 8 | 30 | 1.6 |
| Substrate 2 | 1.4 | 10 | 35 | 1.4 |
| Substrate 3 | 1.6 | 12 | 40 | 1.2 |

As a result, the cycle time of the soldering of the substrate was about 2 min, so that many kinds of substrates differing in substrate preheating conditions or substrate feed speed conditions could be continuously manufactured every about 2 min.

It was found that the lift-off generation rate of connection portions of a 400-pin PGA-LSI thus wave soldered on the substrate was about 0.1%, and the lift-off generation rate of a plastic-made connector was about 0.5% on average.

It was also found that the oxygen concentration in the chamber at the time of soldering could be lowered to or below about 5000 ppm, and the percentage of connection portions where a target flow-up ratio of 80% cannot be attained could be reduced to about 5% on average.

[Fifth Embodiment]

A fifth embodiment differs from the fourth embodiment in that one of portions 110a, in contact with the conveyor, of the substrate holder 101 is made up of a movable-type contact portion 101c so as to follow the shape of sag or the like of the conveyor 21 (changes in shape caused by the movement of the conveyor 21), as shown in FIG. 9. This arrangement reduces slippage of the substrate conveying holder, and bad conveying, due to insufficient contact between the substrate conveying holder and the conveyor arising from changes in the shape such as sag of the conveyor 21 conveying the substrate conveying holder 101.

In the case of the fourth embodiment, slippage of the substrate conveying holder may occur, resulting in that the substrate feed speed becomes nonuniform. If this occurs during when soldering is conducted at the flow soldering portion, soldering at a portion of the substrate is conducted with a slower feed speed, and an excessive quantity of heat is supplied from the solder to the portion of the substrate.

As a result, when a substrate having a thickness of 1.6 mm, a number of layers of 12, a through-hole inside diameter of 0.8 mm and having a QFP-LSI and the like mounted thereon in the previous steps was subjected to wave soldering (flow soldering) under the conditions of a substrate feed speed set point of 1.2 m/min and a solder temperature of 250° C., exfoliation of the QFP-LSI was generated at a probability of about 0.5%.

Segregation of a low melting point phase consisting of Sn and Ag coming from the solder and Pb coming from the lead of the QFP-LSI was found at the connection portion where exfoliation occurred, which shows an excessive quantity of heat was supplied from the solder to the connection portion.

In view of this, wave soldering was conducted by the use of the substrate conveying holder 101 improved by the above-mentioned method.

As a result, the exfoliation generation rate of the QFP-LSI was reduced to or below 0.1%.

As has been described above, according to the embodiments of the present invention, by a method in which the blow nozzle 4a for blowing cooling air to the lower side of the substrate and the intake port 4b for sucking the inert gas atmosphere such as nitrogen for cooling from the chamber 1 are disposed adjacently to each other, by a method in which a valve, a shutter 1g or a curtain 1h of an inert gas such as nitrogen is provided at the inlet 1a and the outlet 1b of the chamber 1, or by a method in which the substrate conveying holder 101 is provided with a valve 101b or the like for restraining penetration of atmospheric air into the chamber 1 through the inlet 1a and the outlet 1b of the chamber 1 and in which, when the substrate 11 in one substrate conveying holder 101 is subjected to wave soldering, two holders 101 among other holders stand by at the stations provided at the inlet 1a and the outlet 1b of the chamber 1 or one holder 101 stands by at the station 22 provided at the inlet 1a or the outlet 1b of the chamber 1, an inert gas atmosphere with an oxygen concentration of not more than about 1% suitable for wave soldering using lead-free solder can be established at the soldering portion.

In addition, according to the embodiments of the present invention, it is possible to cope with the wave soldering using lead-free solder which needs measures for soldering in a stable inert gas atmosphere such as nitrogen and measures against lift-off or the like. In consideration of the case where soldering conditions for the substrates are changed frequently, it is also possible according to the present invention to reduce in size the chamber filled with the inert gas atmosphere such as nitrogen for surrounding the wave soldering portion, to thereby ensure that the substrate does not dwell in the wave soldering apparatus for a long time, and to shorten as much as possible the production time per substrate, thereby enabling manufacture of many kinds of circuit substrates.

According to the present invention, when wave soldering a substrate (inserted component parts) using lead-free solder, a lift-off phenomenon is markedly suppressed, and high reliability of connection portions can be secured.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A wave soldering apparatus using lead-free solder, for wave soldering a substrate, with component parts mounted thereon from the upper side, by using lead-free solder, in a chamber having an inert gas atmosphere, the chamber comprising:

conveying means for conveying said substrate from an inlet to an outlet of said chamber;

a preheating portion for preheating the lower side of said substrate conveyed in through said inlet of said chamber by said conveying means;

a wave soldering portion for wave soldering said lower side of said substrate preheated at said preheating portion and conveyed by said conveying means, by contact with a molten lead-free solder blowout;

a cooling portion including a blowing portion for introducing an inert gas atmosphere in said chamber to said lower side of said substrate wave-soldered with said lead-free solder at said wave soldering portion and conveyed by said conveying means, said preheating portion, said wave soldering portion, and said cooling portion being provided in said chamber; and wherein the substrate is mounted on a conveying holder for conveyance by the conveying means, the conveying holder being configured to restrain air flowing into the chamber when the conveying holder is positioned at either of the inlet or the outlet of the chamber.

2. A wave soldering apparatus using lead-free solder as set forth in claim 1, further comprising a flux applying device for applying flux to said substrate before conveying it into said chamber.

3. A wave soldering apparatus using lead-free solder as set forth in claim 1, wherein an intake port for removing said inert gas is provided in proximity to said cooling portion.

4. A wave soldering apparatus using lead-free solder as set forth in claim 1, wherein said blowing of said inert gas from said blowing portion to said lower side of said substrate is conducted intermittently in said cooling portion.

5. A wave soldering apparatus using lead-free solder as set forth in claim 1, wherein a blower and a cooler are provided for recirculating and cooling said inert gas atmosphere.

6. A wave soldering apparatus using lead-free solder as set forth in claim 1, wherein a mechanism which can convey said substrate and which restrains air flowing into said chamber at least at the time of cooling, is provided in said inlet and said outlet of said chamber.

7. A wave soldering apparatus using lead-free solder as set forth in claim 1, wherein an inert gas curtain for restraining air from flowing into said chamber is provided at said inlet and said outlet of said chamber.

8. A wave soldering apparatus using lead-free solder as set forth in claim 1 further including, a station where said conveying holder can stand by at each of said inlet and said outlet of said chamber.

9. A wave soldering apparatus using lead-free solder as in claim 1 wherein the conveying means comprises two conveyors between which the conveying holder is conveyed, and the conveying holder includes contact portions movable with respect to the holder to enable it to follow changes in shape caused by movement of the conveyor.

10. A wave soldering apparatus for wave soldering of a component mounted at an upper side of a substrate to the substrate with lead-free solder in a chamber configured to convey the substrate in a direction from an inlet to an outlet of the chamber, the chamber comprising:
    a first portion configured to reduce flow of atmospheric air in the vicinity of the inlet of the chamber;
    a second portion configured to preheat a lower side of the substrate;
    a third portion configured to perform wave soldering of the component to the substrate by contacting the lower side of the substrate with molten lead-free solder blowout;
    a fourth portion configured to blow a recirculated inert gas to the lower side of the substrate; and
    a fifth portion configured to reduce flow of the atmospheric air in the vicinity of the outlet of the chamber,
    wherein the first portion, the second portion, the third portion, the fourth portion, and the fifth portion are arranged in the chamber in sequential order form the inlet to the outlet of the chamber, and wherein each of the first portion and the fifth portion comprises a plurality of finds arranged along the direction.

11. A wave soldering apparatus according to claim 10 wherein the plurality of fins arranged opposite to the upper side and the lower side of the substrate.

12. A wave soldering apparatus according to claim 10 wherein an inert gas nozzle is arranged between the inlet of the chamber and the plurality of fins in the first portion, and another inert gas nozzle is arranged between the outlet of the chamber and the plurality of fins in the fifth portion.

13. A wave soldering apparatus according to claim 10 wherein each of the first portion and the fifth portion includes an inert gas nozzle.

14. A wave soldering apparatus according to claim 10 wherein the fourth portion comprises a first nozzle blowing inert gas to the lower side of the substrate and a second nozzle removing the inert gas blown from the first nozzle.

15. A wave soldering apparatus according to claim 14 wherein each of the first nozzle and the second nozzle is arranged opposite to the lower side of the substrate conveyed in the chamber.

16. A wave soldering apparatus according to claim 14 wherein a blower and a chiller are provided between the second nozzle and the first nozzle, and the inert gas from the second nozzle is recirculated through the blower and the chiller to the first nozzle.

17. A wave soldering apparatus according to claim 10 wherein the chamber is filled with the inert gas.

18. A wave soldering apparatus according to claim 10 wherein the inert gas comprises nitrogen.

* * * * *